Aug. 18, 1931.      H. F. FLOWERS      1,819,411

FLUID PRESSURE RAISING MECHANISM

Original Filed Sept. 27, 1924    2 Sheets-Sheet 1

Inventor

H. F. Flowers,

By

Attorneys

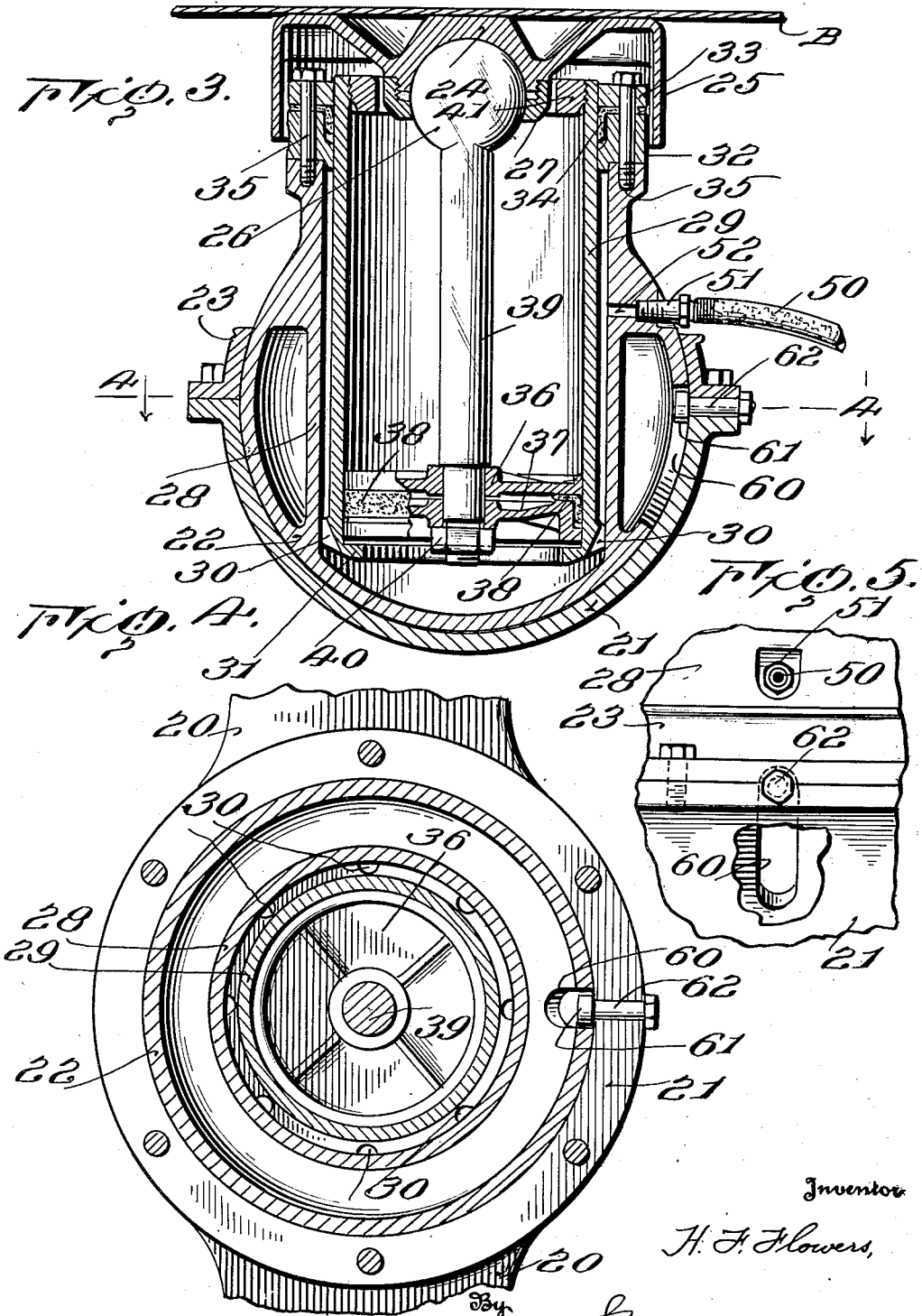

Patented Aug. 18, 1931

1,819,411

UNITED STATES PATENT OFFICE

HENRY FORT FLOWERS, OF FINDLAY, OHIO

FLUID PRESSURE RAISING MECHANISM

Original application filed September 27, 1924, Serial No. 740,307. Divided and this application filed November 23, 1926. Serial No. 150,330.

This invention relates to improvements in a fluid pressure raising mechanism which is particularly adapted for employment with vehicles which are adapted to dump in three directions.

This application is a division of my copending application Serial No. 740,307, filed Sept. 27, 1924, now U. S. Patent No. 1,611,012, granted December 14, 1926.

The present invention proposes a fluid actuated hoisting device which is to be positioned on the frame of the vehicle so that when energized by a fluid medium it will exert a relative raising and lifting action upon the tiltable body, whereby the latter may be caused to tilt for dumping.

To this purpose, the structure is so arranged that it may rock freely into any necessary operative position without disruption of any connection, and with a minimum of strain upon any part. Furthermore, the device is so constructed and arranged that it occupies a minimum of space between the floor of the body and the frame, whereby the clearance beneath the vehicle is not reduced, and whereby the parts of the structure itself may be easily protected from injury.

With these objects in view, one form of execution of the invention has been shown on the accompanying drawings, in which:

Fig. 3 is an enlarged view in diametral section through the lifting mechanism, in collapsed or lowered position.

Fig. 4 is a view in horizontal section substantially on the line 4—4 of Fig. 3.

Fig. 5 is a fragmentary view in elevation from the front of the vehicle showing the pin and slot arrangement for preventing rotation of the lower ball with respect to its socket.

Figure 1:
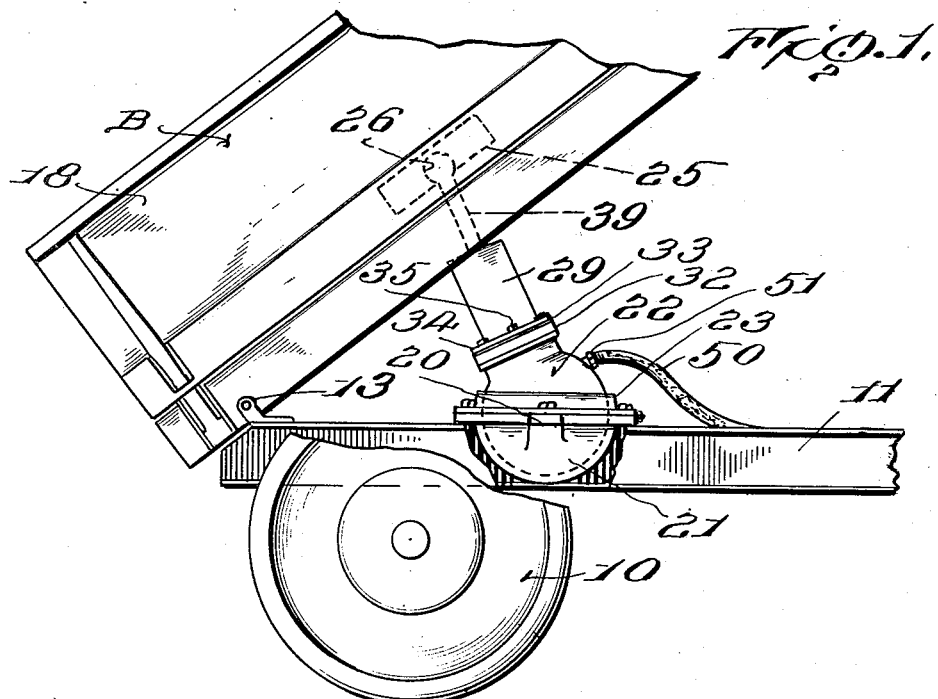
Figure 1 is a fragmentary side elevation of a vehicle, representing the frame and the dump body as hinged together, with a lifting device of the present type located between the frame and the body and in the extended position, whereby the dump body has been tilted for rear dumping.

According to this invention, a socket is rigidly mounted on the frame of the vehicle and serves to receive a ball which constitutes in effect a cylinder. A piston is movable within this cylinder and itself constitutes a cylinder for a further piston which is connected by a rod to an upper ball which is in operative raising relation to the vehicle body. A fluid may be caused to enter the ball and thereby to successively force the pistons outward with a progressive extension to secure this lifting effect. The fluid medium necessary for this purpose is introduced through a hose which is fitted to the ball above its horizontal central plane, whereby the delivery of the medium to the ball is facilitated, and at the same time the ball may extend for a full hemisphere in contact with its supporting socket. Protecting devices are provided to prevent the passage of dirt to the operative pistons while the vehicle is in normal transport; to prevent the carrying of dirt into the cylinders while the pistons are collapsed; and to limit the movements of the several pistons and cylinders with respect to each other. Furthermore, means are provided to prevent a rotation of the ball within its socket whereby a strain might be placed upon the hose for the fluid medium.

In the drawings, the wheels 10 of a vehicle support a frame 11 which carries a body B thereon. This body is mounted on a subframe 12 which is preferably hinged to the frame 11 at the rear, as at the pivot 13. The dump body proper is mounted on this subframe 12 by any appropriate means, whereby it may tilt to either side. A suitable mechanism for this purpose has been described and claimed in my copending application Serial No. 740,307, to which reference is made for a complete disclosure. In it, the dump body B selectively pivots about an axis 15 at each side for dumping to the respective side; and mechanisms including links 16, 17 may be connected to side doors such as 18 to open and close the same during the movements of the body, and to hold the same in closed position when the body is in position for transport. All these features have been described in my aforesaid copending application and need not be referred to in detail here, since the representation is merely conventional of one type of dump vehicle to which my present raising mechanism may be associated for actuation.

Figure 2:
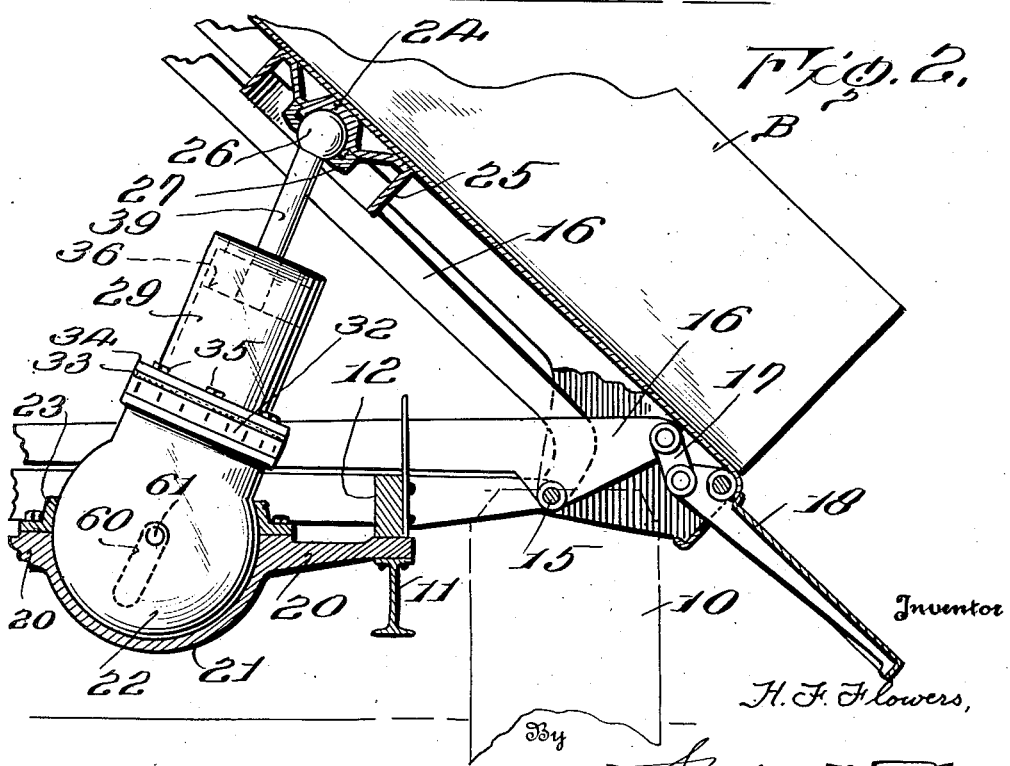
Fig. 2 is a partial section transversely of the vehicle, showing the mechanism in position between the frame and the body, but extended for raising and tilting the body about a fulcrum for side dumping.

Rigidly mounted on the frame 11 is a bridge 20 which is represented as being formed integrally with a lower hemispherical socket member 21. A lower ball 22 fits snugly within this socket and is adapted for free rocking therein in either lateral direction as shown in Fig. 2, or in a rearward direction as shown in Fig. 1. A clamping ring 23 is bolted to the lower casting 21 and extends upwardly and inwardly in contact with the surface of the ball 22 for a sufficient distance to assure that this ball will not be dislodged from its socket 21.

Secured to the vehicle body is an upper socket 24 which has formed therewith a downwardly extending skirt 25. This socket 24 receives the upper ball 26 which is adapted for rocking movement therein to accommodate for the tilting movements of the body in the various directions. A clamping ring 27 is secured to the socket 24 and extends around the surface of the ball 26 for a sufficient distance to form a positive stop against the withdrawal of the ball 28 from its socket 24.

As shown in Fig. 3, the ball 22 has a cylinder 28 formed therewith, preferably integrally with the structure of the ball during process of manufacture. The inner face of this cylinder is dressed to receive a reciprocating piston 29 which is hollow and has the inner face of its own wall likewise formed as a cylinder to receive a further piston. The sleeve piston 29 has the outward projections 30 forming a notched flange which closely fits the inner wall of the cylinder 28 and is guided thereby, while apertures are left so that fluid may easily pass from above these projections to beneath them or vice versa. The sleeve piston 29 also has at its bottom the inwardly extending flange 31 which has a central aperture for the similar passage of fluid.

At the upper and open end of the cylinder 28 is secured a stop ring 32, upon which rests a packing and scraping washer 34 which is clamped in position by a clamping ring 33. The bolts 35 are employed to draw the clamping ring 33 down into binding relation with the washer 34 and likewise to hold the several members tightly to the upper edge of the cylinder 28. The packing washer 34 is of L-shaped cross section, with a broad face resting against the outer wall of the sleeve piston 29. The rings 32 and 33 likewise closely fit the piston 29.

The inner piston comprises the upper disk 36 and the lower disk 37 which are so shaped with respect to each other as to support a further packing and scraping washer 38 of L-shaped section between them and in firm contact with the inner wall of the sleeve piston 29. The lower disk 37 has an outward and downward extension which is adapted to come into contact with the internal flange 31 to serve as a positive stop to limit the downward movement of the inner piston with respect to the sleeve piston 29. Both disks 36 and 37 are seated about the reduced end of the piston rod 39 which is preferably formed integrally with the upper ball 26, and has a threaded lower end to receive the clamping nut 40 which binds the two disks 36, 37 into close relationship with each other to secure the packing washer 38 in place. The disks 36, 37 also extend to a close fit with the piston 29.

The internal wall of the sleeve piston 29 is preferably screw-threaded at its upper end to receive the externally threaded stop ring 41 which limits the upward movement of the disk 36 during the extension of the raising mechanism and thereby eliminates the possibility of projecting the inner piston out of the sleeve piston 29.

Fluid medium of any desired nature and coming from any suitable source such as a hydraulic pump driven by the engine of an automobile truck when the device is employed therewith, is delivered under suitable conditions and at selected times through a hose line 50 to a connection 51 which leads to a passage 52 in the body of the lower ball 22. After the pressure medium is forced through hose 50, it passes through the conduit 52 and into the space between the sleeve piston 29 and the cylinder 28, and passes downwardly through the apertures existing between the projections 30 into the internal space at the bottom of the ball 22. As the pressure builds up, the fluid medium exerts an upward thrust upon both the sleeve piston 29 and upon the internal piston presenting the disk 37 at its bottom. These pistons are successively moved in an upward direction, against the action of gravity due to the weight of the superimposed dump body and its load, and by appropriate means at the driver's selection, the dump body is caused to tilt about the end pivot 13 or about a selected lateral pivot 15, as set forth in my aforesaid copending application. After the sleeve piston 29 approaches the upward end of its permissive travel, the projections 31 which have been guiding the sleeve piston 29 in its upward movement come into contact with the stop ring 32 and it is thereby prevented from further upward movement. Likewise, when the outer flanged edge of the disk 36 comes in contact with the stop ring 41, the internal piston is prevented from any further upward movement, and the device is then at its full extension, beyond which it cannot go in the normal operation of the device. During this extension and by reason of its positive connection to the bridge 20 on the frame and to the socket 24 on the body, the mechanism as a whole rocks about a horizontal line passing through the center of the lower ball, and secures a relative rocking between the socket 24 and the upper ball 26 about the center of the same. This relative rocking may be out of a vertical into a rearwardly or a laterally inclined direction as shown in Figs. 1 and 2, depending upon the direction of tilt. During the lateral tilting, as in Fig. 2, the connection 51 remains above the collar ring 23: and does not come in contact therewith, so that the entire hemispherical surface of the socket 21 may be employed for supporting the ball, whereby the weight is disposed over a large area and very slight friction and wear occur. On the other hand, when the device tilts rearwardly as shown in Fig. 1, the connection 51 is raised away from the collar 23, and likewise the same large area may be employed.

When the device has attained any extended position, and the fluid medium is allowed to relieve itself through the hose 50 in any suitable manner as already well known in the art, the fluid within the cylinders will be driven downward by the weight of the superposed load and will pass through the apertures between the projections 30 and into the passage 52, thus gaining entry to the hose 50 and passing to a suitable exhaust. The device gradually collapses as the fluid slips away from beneath it and moves back into the position shown in Fig. 3, at a rate of speed which may be regulated by the controlling means on the hose 50. During this movement, if any dust has accumulated on the external wall of the sleeve piston 29, the packing and scraping washer 34 will maintain a tight joint; and will assist the stop ring 33 in scraping this accumulation from the exterior of the piston so that little or none of it comes in contact with the seating ring 32, or passes to the interior of the cylinder 28.

In the same manner, if any dust be present on the interior wall of the sleeve piston 29, it will be scraped off during the extension movement by the flange of the disk 36, which by the assistance of the washer 38 will substantially prevent any particles remaining on the inner wall of the sleeve piston 29.

Furthermore, it will be noted that in the collapsed position as shown in Fig. 3, the skirt 29 fits downward around and at a slight distance from the several rings 33 and 32, thereby preventing the settling of dust within the interior of the mechanism.

In order to prevent any rotation of the ball 22 within its socket other than a rocking about axis lines in the horizontal plane through the center of the ball and respectively transversely and longitudinally of the vehicle, a slot 60 is provided in the external wall of the ball to cooperate with a head 61 of a guide pin 62 which is located in the body of the socket 21 or between this socket and the collar 23. This slot 60 is shown as located with its axis being a great circle of the ball and lying in a plane longitudinal of the vehicle and containing the axis of the cylinder 28; the axis of the pin 62 passes through the center of the ball 22, i. e., through the fixed point about which it moves in rocking in any direction. As shown in Figs. 1 and 3, when the device tilts toward the rear, the ball rocks about its transverse center line and is guided in its movement by the engagement of this pin in its socket; and when the device tilts into either side (Fig. 2), the ball rocks about an axis which coincides with the axis of the pin 62, and hence the ball is free to move.

It is apparent that the invention is not limited to the specific form and dimensions shown, but that it may be employed in general with any type of vehicle employing a fluid pressure medium for the purpose of securing a raising or thrust action.

I claim:

1. In a power unit, a lower socket, a lower ball rockable in said lower socket, a cylinder in said ball, a piston movable in said cylinder and having its external wall spaced therefrom, an inwardly extending flange at the upper end of said cylinder to pack and guide said piston with respect to said cylinder, spaced flange members at the lower end of said piston to guide said piston in said cylinder, an upper socket, an upper ball rockable in said upper socket, a piston rod connecting said piston and upper ball, said lower socket and lower ball having an interengaging pin and slot connection, said slot having its center line in a plane including the axis of the cylinder piston and piston rod, said pin having its axis passing through the center of the ball, and a fluid pressure medium connection to said lower ball located in the plane of said slot and above said lower socket and communicating with the interior of said cylinder above the position of said lower flange members when the unit is collapsed.

2. In a power unit, a socket having an open top, a ball rockable in said socket, said ball being formed internally as a cylinder, an inner cylinder open at its lower end and having its external wall in spaced relation to said ball cylinder and movable therein to extend through said open top, a guiding and packing flange at the upper end of said ball cylinder to guide and pack said inner cylinder with respect thereto, spaced guide members on the lower end of said inner cylinder for engaging the wall of said ball cylinder and forming passages for the movement of fluid from one side of said guide members to the other, a piston in said inner cylinder, and a fluid power line extending into the interior of said ball cylinder at a point above said socket and above the position of said flange members when the unit is collapsed whereby said line does not interfere with the rocking of said ball in said socket.

3. In a power unit, a lower socket having an open top, a ball movable in said socket, said socket exposing the upper end of the ball so that the latter is free to move in the socket through a substantial angle in directions at mutual right angles, said ball being formed interiorly as a cylinder, a piston movable in said cylinder to extend through said open top and between positions above and below the center of said ball, an inwardly directed packing and guiding means at the upper end of said cylinder to guide and pack said piston with respect thereto, at least a part of the external wall of said piston being spaced from the wall of said cylinder, and a connection for the admission of fluid pressure medium through the ball to the interior of said cylinder, said connection being located at and in communication with the interior of said cylinder at a point above the center of said ball.

4. In a dump vehicle having a rigid lower socket with an open top, a power unit having in combination a movable ball located in said socket and formed with an outer cylinder having its lower end below the center of the ball and projecting through said open top, an inner cylinder movable in said outer cylinder into and out of said ball and socket, an internal flange on said outer cylinder having a recess to receive packing adjacent the open end of said outer cylinder, means to clamp said packing in position, a stop on said inner cylinder adapted to come in contact with said flange on the outer cylinder and permitting passage of fluid under pressure from one side of said stop to the other, and means to prevent relative rotation of said ball and socket about the axis of said outer cylinder.

5. In a dump vehicle having a rigid socket with a open top, a power unit having in combination a movable ball located in said socket and formed with an outer cylinder having its lower end below the center of the ball and projecting through said open top, an inner cylinder in spaced relationship to said outer cylinder and oscillating with said ball, an inwardly projecting flange on said outer cylinder having means to guide and pack said inner cylinder, a stop on said inner cylinder adapted in the limit position to engage said flange to prevent further relative extension movement of said cylinders, a connection to admit fluid medium under pressure into said outer cylinder at a point above the center of the ball and socket, said stop having passages therethrough to permit the passage of fluid from said connection to the inner cylinder when said stop is below said connection.

6. In a three way dump vehicle, a frame-supported lower socket with an open top, a rockable ball located in said socket and formed with a cylinder having its lower end below the center of the ball and projecting into said open top, said socket including a portion extending above the ball center to hold said ball in place, an extensible member movable axially in said cylinder and provided at its upper end with a connection to the vehicle body, and having a stop member at its lower end in guiding contact with said cylinder wall, an internal packing and guide member at the upper edge of the cylinder engaging said extensible member and adapted to engage said stop to limit the travel and extension of said member, said stop having passages therethrough to permit the movement of liquid under pressure from one side of said stop to the other, and a connection to admit fluid medium under pressure into said cylinder, said connection being located above said socket portion whereby said connection does not limit the movement of said ball in said socket during dumping in any of the three directions.

7. In a dump vehicle, a lower socket rigid with the vehicle frame and having an open top, an upper socket member mounted to move with the dump body of the vehicle, a ball movable in said lower socket and having an upward extension, said ball and extension projecting through said open top and being formed interiorly as a cylinder, an inner member movable in said cylinder into and out of said ball, an internal flange at the upper end of said extension provided with a recess to receive packing, a packing in said recess and in contact with said inner member, means to clamp said packing in position, an outwardly projecting stop on said inner member adapted to come in contact with said flange to prevent further relative movement of said inner member, said inner member being provided with a ball engaged in said upper socket, and a skirt formed on said upper socket to fit around said extension to protect and cover the upper end of said ball, and to exclude dirt from said upper ball and socket and said packing when the members are collapsed.

In testimony whereof, I affix my signature.

HENRY FORT FLOWERS.